US006771818B1

(12) United States Patent
Krumm et al.

(10) Patent No.: US 6,771,818 B1
(45) Date of Patent: Aug. 3, 2004

(54) SYSTEM AND PROCESS FOR IDENTIFYING AND LOCATING PEOPLE OR OBJECTS IN A SCENE BY SELECTIVELY CLUSTERING THREE-DIMENSIONAL REGIONS

(75) Inventors: John C. Krumm, Redmond, WA (US); Stephen C. Harris, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/542,147

(22) Filed: Apr. 4, 2000

(51) Int. Cl.[7] .................................................. G06K 9/62
(52) U.S. Cl. ........................ 382/225; 382/154; 382/218; 382/209; 382/305
(58) Field of Search ................................ 382/103, 106, 382/153, 154, 181, 190, 197, 209, 218, 225, 254, 257, 272, 288, 305; 345/418–420; 348/169–171

(56) References Cited

U.S. PATENT DOCUMENTS

| 4,731,860 | A | * | 3/1988 | Wahl ............................ 382/281 |
| 4,739,401 | A | * | 4/1988 | Sacks et al. ................. 382/103 |
| 4,751,643 | A | * | 6/1988 | Lorensen et al. ............ 382/132 |
| 5,971,583 | A | * | 10/1999 | Ohnishi et al. ............... 700/98 |
| 6,016,487 | A | * | 1/2000 | Rioux et al. ..................... 707/2 |
| 6,173,066 | B1 | * | 1/2001 | Peurach et al. .............. 382/103 |
| 6,173,070 | B1 | * | 1/2001 | Michael et al. .............. 382/145 |
| 6,236,736 | B1 | * | 5/2001 | Crabtree et al. ............. 382/103 |
| 6,256,046 | B1 | * | 7/2001 | Waters et al. ................ 345/473 |
| 6,381,346 | B1 | * | 4/2002 | Eraslan ......................... 382/118 |
| 6,539,107 | B1 | * | 3/2003 | Michael et al. .............. 382/154 |
| 6,556,704 | B1 | * | 4/2003 | Chen ............................ 382/154 |

OTHER PUBLICATIONS

Wren, et al. "Pfinder: Real–Time Tracking of the Human Body", IEEE, pp. 780–785, 1997.*

C. Wren, A Azarbayejani, T. Darrell and A. Pentland. Pfinder: Real–time tracking of the human body. In *IEEE Transactions on Pattern Analysis and Machine Intelligence*, Jul. 1997, vol. 19, No. 7, pp. 780–785.

I. Haritaoglu, A4—Real–time system for detection and tracking of people and recognizing their parts. *University of Maryland technical report*, Aug. 1997.

M. Isard and A. Blake. Contour tracking by stochastic propagation of conditional density. *Proc. ECCV 1996*.

(List continued on next page.)

*Primary Examiner*—Daniel Mariam
(74) *Attorney, Agent, or Firm*—Lyon & Harr, LLP; Mark A. Watson (57) ABSTRACT

The present invention is embodied in a system and process for identifying and locating people and objects of interest in a scene by selectively clustering distinct three-dimensional regions or "blobs" within the scene and comparing the blob clusters to a model. Specifically, a background subtraction process is used to generate a working image from a baseline depth image and a live depth image of the scene. Distinct blobs in the working image are selectively clustered to generate "candidate blob clusters" which are then compared to a model representing the people or objects of interest. The comparison of candidate blob clusters to the model identifies the blob clusters that most accurately represent the people or objects of interest in the scene by determining the closest match or matches to the model. Blob clusters may be compared to a plurality of models representing people or objects of different sizes and shapes. Sequential live depth images may be captured and analyzed in real-time using the system and process of the present invention to provide for continuous identification and location of people or objects as a function of time.

36 Claims, 4 Drawing Sheets

OTHER PUBLICATIONS

S. Rowe and A. Blake. Statistical mosaics for tracking. *J Image and Vision Computing*, 14(8), 1996.

C. Eveland, K. Konolige and R. C. Bolles. Background modeling for segmentation of video-rate stereo sequences. In *Proceedings of the IEEE Conference on Computer Vision and Pattern Recognition*, pp. 226, 1998.

I. Haritaoglu, D. Harwood and L. Davis. W4S: A real-time system for detecting and tracking people in 2½D. *Image and Vision Computing Journal*, Jan. 1999.

T. Darrell, G. Gordon, M. Harville and J. Woodfill. Integrated person tracking using stereo, color, and pattern detection. In *Proceedings of the IEEE Conference on Computer Vison and Pattern Recognition*, pp. 601–609, Santa Barbara, Jun. 1998, IEEE.

* cited by examiner

SYSTEM AND PROCESS FOR IDENTIFYING AND LOCATING PEOPLE OR OBJECTS IN A SCENE BY SELECTIVELY CLUSTERING THREE-DIMENSIONAL REGIONS

BACKGROUND

1. Technical Field

The invention is related to a system and process for locating people and objects of interest in a scene, and more particularly, to a system and process that locates and clusters three-dimensional regions within a depth image, and identifies the content and position of clustered regions by comparing the clusters to a model.

2. Related Art

Most current systems for determining the presence of persons or objects of interest in an image of a scene have involved the use of a sequence of pixel intensity-based images or intensity images for short. For example, a temporal sequence of color images of a scene is often employed for this purpose [1]. Persons or objects are typically recognized and tracked in these systems based on motion detected by one of three methods—namely by background subtraction [2], by adaptive template correlation, or by tracking color contour models [3, 4].

While the aforementioned locating methods are useful, they do have limitations. For example, the use of intensity images results in the presence of background "clutter" that significantly affects the reliability and robustness of these techniques. In addition, the adaptive templates employed in the adaptive template correlation techniques tend to drift as they pick up strong edges or other features from the background, and color contour tracking techniques are susceptible to degradation by intensity gradients in the background near the contour. Further, the image differencing methods typically used in the foregoing techniques are sensitive to shadows, change in lighting conditions or camera gain, and micro-motions between images. As a result, discrimination of foreground from background is difficult.

More recently, the use of sequential range images of the scene has been introduced into systems for locating persons and objects, and for tracking their movements on a real time basis [5, 6, 7]. In general, the advantage of using range images over intensity images is that the range information can be used to discriminate the three-dimensional shape of objects, which can be useful in both locating and tracking. For example, occluding surfaces can be found and dealt with as the tracked object moves behind them. Recognizing objects is also easier, since the actual size of the object, rather than its image size, can be used for matching. Further, tracking using range information presents fewer problems for segmentation, since range information is relatively unaffected by lighting conditions.

While the locating and tracking systems employing range information can provide superior performance in comparison to systems employing only intensity images, there is still considerable room for improvement. For example, the aforementioned systems use range information typically for background subtraction purposes, but rely mostly on intensity image information to locate individual people or objects in the scene being analyzed. Further, when using a background subtraction process, objects in the scene being analyzed tend to separate into a plurality of distinct three-dimensional regions. For these and other reasons, systems using such methods tend to exhibit poor discriminatory ability when two people or objects are close together in the scene. The system and process according to the present invention resolves the deficiencies of current locating and tracking systems employing range information.

It is noted that in the preceding paragraphs, the description refers to various individual publications identified by a numeric designator contained within a pair of brackets. For example, such a reference may be identified by reciting, "reference [1]" or simply "[1]". Multiple references are identified by a pair of brackets containing more than one designator, for example, [5, 6, 7]. A listing of the publications corresponding to each designator can be found at the end of the Detailed Description section.

SUMMARY

The present invention involves a new system and process for use in an object recognition scheme for comparing three-dimensional regions (referred to as "blobs") in images to one or more models in order to identify the location of people or objects within a scene. This object recognition scheme allows for real-time location and tracking of people or objects of interest within the scene. The technique generally entails first generating an initial three-dimensional depth image, often referred to as a background or baseline depth image, of the scene or area of interest. The baseline depth image is generated using conventional methods such as a stereo camera mechanism. Conventional processing of the baseline depth image is used to identify the spatial coordinates of three-dimensional image pixels within the three-dimensional volume represented by the image. During identification and location operations, an image acquisition process, such as, for example, a stereo camera mechanism, is used to capture live depth images at any desired scan rate. The identification and location of people and or objects may then be determined by processing a working image obtained from a background subtraction process using the baseline depth image and a live depth image. In other words, the baseline depth image is subtracted from the live depth image. Any pixel in the live depth image that differs significantly from the background image becomes part of the working image that is then processed to identify and locate people or objects.

The aforementioned background subtraction process typically results in a depth image containing a number of distinct three-dimensional regions or "blobs." Each resultant blob in the working image is formed of a plurality of image pixels having x, y, and z coordinates defining the spatial location of each pixel within the three-dimensional space representing the scene. The subtraction process typically results in a number of distinct blobs for several reasons. First, featureless or textureless regions within the area of interest do not typically provide good depth data when using stereo cameras. These regions are typically broken up or eliminated in the subtraction process. Consequently, a uniformly lit person wearing relatively smooth solid color clothing such as a jacket or shirt would tend to be represented in the working image as a number of separated blobs. Further, noise in either the baseline or live depth images may cause people or objects to partially blend into the background. As a result, people or objects again tend to break up into a number of separated blobs in the working image. In addition, image noise or distortion, or extraneous objects not of interest, may create spurious blobs that also become part of the working image.

Processing of the working image involves identifying which of the blobs belong to the same person or object of interest so as to accurately identify and locate that person or object within the area of interest. A "clustering" process is used to roughly identify each set of blobs in the working image that may belong to a particular person or object of interest. An analysis of the blob clusters produced by the clustering process is used to identify clusters of blobs that most accurately represents the people or objects of interest by determining the closest match or matches to a model representing the people or objects of interest. The model is a shape such as an ellipsoid having the approximate dimensions of the person or object of interest. In addition, blob clusters may be compared to any number of different models representing people or objects of different shapes and sizes.

One method for determining the closest match between a cluster of blobs and a model is to compare every possible cluster of blobs to the model. However, as the number of blobs increases, a corresponding exponential increase in the number of candidate blob combinations reduces the performance of this method. Further, with this method, some candidate blob clusters are either too small or too large to compare favorably to the model, and such comparisons tend to waste both time and computing power.

A more preferred method for generating candidate clusters of blobs is to connect all blobs based on a minimum spanning tree. To this end, all the blobs are connected together via the shortest total length of lines. The length of a connection between any two blobs may be determined using any consistent method for determining distance between the blobs. For example, one such method would compute the distance between the centroids of connected blobs. Another exemplary method is to connect two blobs with a line segment or link between the centroids of the blobs, then to compute the length of the portion of the line segment between the point where the line leaves the first blob and the point where it enters the second blob. Still another exemplary method is to compute the distance between the nearest pair of points on two neighboring blobs.

The minimum spanning tree method provides a starting point for ensuring that blobs which are physically close together are used to generate candidate clusters, while blobs which are further apart are not. Specifically, once all blobs have been connected, connection links that exceed a prescribed threshold distance are eliminated. Elimination of these longest links serves to eliminate some or all links to spurious blobs, and to reduce the number of blob clusters likely to be identified as invalid based on the subsequent comparison to the model. Of the remaining n links, candidate clusters of blobs are then generated by eliminating all possible combinations of the longest m links, where m is an integer value between 0 and n. In other words, every possible combination of connected blobs, produced by every possible combination of elimination of the longest m links, serves to generate an initial group of candidate blob clusters.

For example, where elimination of links exceeding the aforementioned threshold distance leaves at least m links, subsequent elimination of all possible combinations of the longest m links will generate a set of $2^m$ groups of candidate blob clusters, with each group comprising a number of distinct clusters of blobs. As the value of m is increased, the number of possible groups of blob clusters increases exponentially. Consequently, a larger sample of candidate clusters is generated as m is increased, thereby improving system accuracy, but decreasing system speed by requiring a larger number of comparisons of candidate blob clusters to the model.

In each group, any cluster of blobs having an area that is not within a prescribed size range is discarded. This prescribed size range is a function of the size of the model. In other words, any cluster of blobs having an area that is obviously too small or too large to correspond to the person or object of interest is discarded. The area of a cluster of blobs is preferably approximated by summing the area of each image pixel making up the blobs in that cluster.

Each of the remaining candidate blob clusters is then compared to a model to determine whether it corresponds to a person or object of interest. Comparison of a candidate blob cluster to the model is accomplished by first computing the three-dimensional (x, y, z) mean or centroid of each blob cluster. The spatial coordinates of this centroid are then subtracted from the spatial coordinates of each pixel in the blob cluster to center the spatial location of the blob cluster. The covariance matrix for that cluster's constituent centered image pixels is then computed. Next, the first two eigenvalues of the covariance matrix are used to define an ellipsoid to represent the candidate blob cluster. Specifically, the first eigenvalue provides the half-length of the major axis of the ellipsoid, while the second eigenvalue provides the half-length of the next longest axis of the ellipsoid. The model of the person or object of interest is defined by the expected values of these two eigenvalues. Consequently, a comparison is made of the eigenvalues of each group of candidate clusters and the expected values associated with the model to determine which group of candidate clusters is closest to the model. The group of clusters having the smallest deviation to the model is chosen as best representing persons or objects of interest contained in the working image. The spatial location of each of the chosen blob clusters in the working image corresponds to the spatial location of the persons or objects of interest in the live depth image.

Sequential live depth images may be captured and analyzed using the methods described above to provide for continuous identification and location of people or objects as a function of time.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
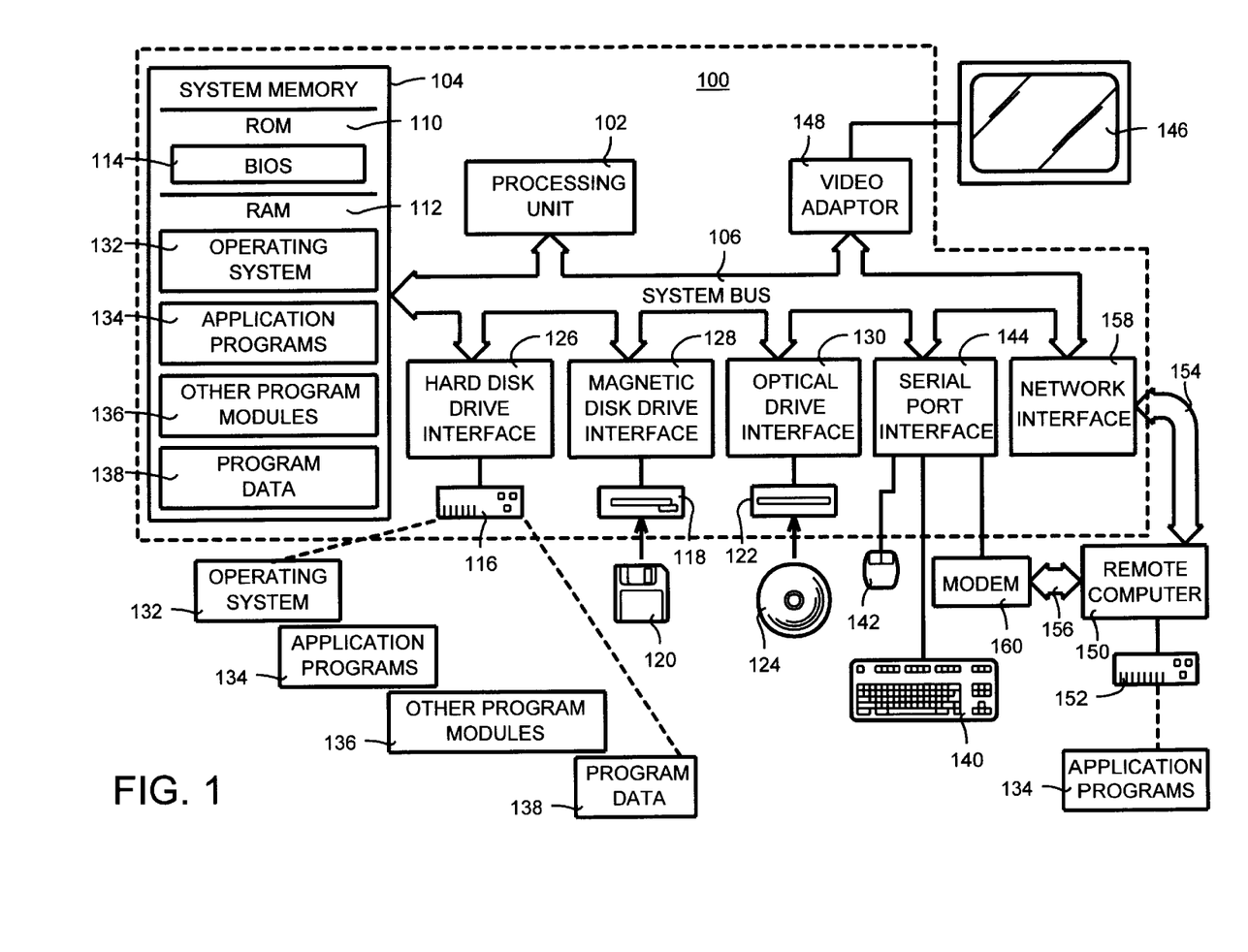
FIG. 1 is a diagram depicting a general-purpose computing device constituting an exemplary system for implementing the present invention.

Exemplary Operating Environment:

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system 114 (BIOS), containing the basic routines that helps to transfer information between elements within computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide storage of computer readable instructions, data structures, program modules and other data for the computer 100. Although the exemplary environment described herein employs a hard disk, a removable magnetic disk 120 and a removable optical disk 124, it should be appreciated by those skilled in the art that other types of computer readable media can store data that is accessible by a computer. Such computer readable media can be any available media that can be accessed by computer 100. By way of example, and not limitation, such computer readable media may comprise communication media and computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct wired connection, and wireless media such as acoustic, RF, infrared and other wireless media. By way of example, and not limitation, communication media includes wired media such as a wired network or direct wired connection, and wireless media such as acoustic, RF, infrared and other wireless media. Computer storage media includes any method or technology for the storage of information such as computer readable instructions, data structures, program modules or other data. By way of example, such storage media includes RAM, ROM, EPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136, and program data 138. A user may enter commands and information into the computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the computer 100 is connected to the local network 154 through a network interface or adapter 158. When used in a WAN networking environment, the computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device. It will be appreciated that the network connections shown are exemplary and other means of establishing a communications link between the computers may be used.

The exemplary operating environment having now been discussed, the remaining part of this description will be devoted to a description of the program modules and process embodying the present invention. The program modules associated with the identification and location processes will be described first in reference to the architectural flow diagram of FIG. 2. Then, the identification and location processes will be described with reference to the flow diagrams of FIG. 3 and FIG. 4.

Figure 2:
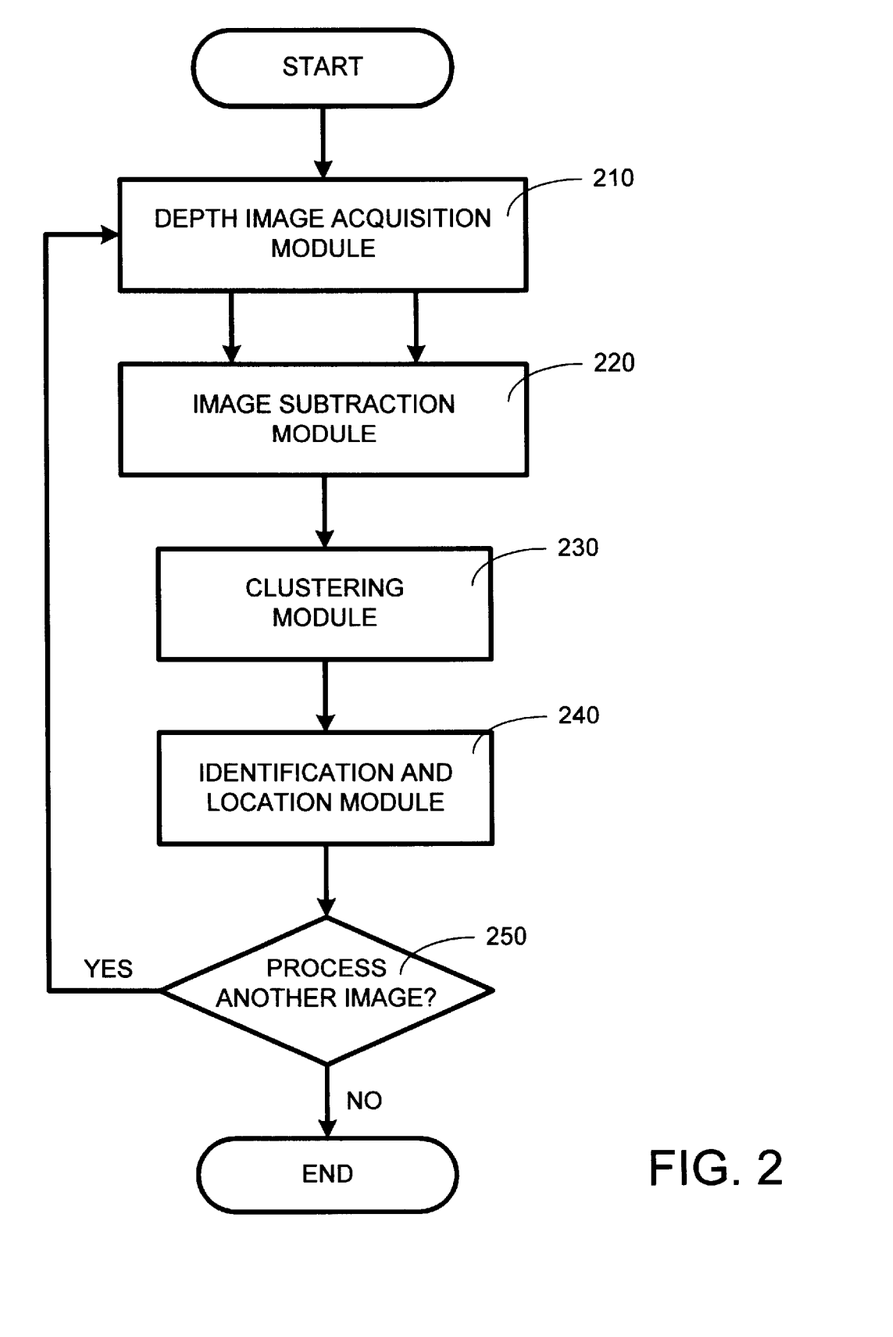
FIG. 2 is an architectural flow diagram depicting the program modules employed for an object identification and location system according to the present invention.

Process Overview:

FIG. 2 is a general architectural flow diagram illustrating program modules used for identification and location of people or objects in accordance with the present system and process. The process is started by acquiring the baseline and live depth images using a depth image acquisition module 210. An image subtraction module 220 then generates a working image by subtracting the baseline depth image from the live depth image from. Next, a clustering module 230 identifies distinct three-dimensional regions or blobs within the working image and generates groups of candidate blob clusters by selectively clustering blobs. These candidate clusters are then compared to the model in an identification and location module 240 to identify and locate people or objects of interest within the scene. The processes described above are repeated as long as processing of additional live depth images is desired 250. The process is ended when there are no more live depth images to process.

Depth Image Acquisition:

The depth image acquisition module 210 uses any of number of conventional methods to acquire one or more initial depth images. These initial depth images are then used individually or combined using conventional methods to generate the aforementioned background or baseline depth image of the area of interest. For example, one method uses a continuous temporal sequence of depth images created from stereo images taken of a scene using a stereo camera mechanism at a fixed position. By combining each of the sequential images, a mean spatial location for each image pixel is computed to define the baseline depth image. Alternately, the spatial location of pixels in a single stereo image can also be used to define the baseline depth image. Further, other devices, such as a laser range finder system, could also be employed to create the desired depth images. Regardless of how they are obtained, these images essentially identify how far away objects are from the camera.

Acquisition of images used for generation of the baseline depth image is performed when the area is clear of people or objects that are the subject of later identification and location efforts. In other words, the baseline depth image generated by the image acquisition module 210 is a three-dimensional picture that represents the area of interest in an "empty" state, wherein there are no extraneous objects or people. The baseline depth image is then stored in the aforementioned computer storage media for later use. New or updated baseline depth images are generated as necessary when the area of interest is physically changed. For example, when furniture is added to, removed from, or moved within the area of interest, a new baseline depth image may be generated. The depth image acquisition module 210 is then used to acquire a live depth image of the area of interest in the same manner as that described for the baseline depth image. Both the baseline depth image and the live depth image are composed of a plurality of image pixels, each having x, y, and z coordinates defining the spatial location of each pixel within the three-dimensional volume representing the area of interest. Once the live depth image has been acquired, both the baseline depth image and live depth image are provided to the image subtraction module 220 for further processing.

Image Subtraction:

The image subtraction module 220 receives the baseline depth image and live depth image from the depth image acquisition module 210. The image subtraction module 220 then uses a conventional background subtraction process to generate the working image which represents the difference between the baseline depth image and the live depth image. In other words, subtracting the baseline depth image from the live depth image produces the working image. The pixels in the working image are those pixels from the live depth image that were at a significantly different depth than their spatial counterpart in the background depth image. All the pixels in the live depth image that are not significantly different from their background counterpart are considered still part of the background and are not subject to further processing. This subtraction process typically results in a depth image containing a number of distinct regions or blobs. Each blob in the working image is formed of a plurality of contiguous image pixels having x, y, and z coordinates defining the spatial location of each pixel within the three-dimensional space representing the scene. The blobs are formed by grouping together those three-dimensional pixels in the working image whose separation distance falls below a certain threshold.

The subtraction process typically results in a number of distinct blobs for several reasons. First, featureless or textureless regions within the area of interest do not typically provide good depth data when using stereo cameras. These regions are typically broken up or eliminated in the subtraction process. Consequently, a uniformly lit person wearing relatively smooth solid color clothing such as a jacket or shirt would tend to be represented in the working image as a number of separated blobs. Further, noise in either the baseline or live depth images may cause people or objects to partially blend into the background. As a result, people or objects again tend to break up into a number of separated blobs in the working image. In addition, image noise or distortion, or extraneous objects not of interest, may create spurious blobs that also become part of the working image.

Blob Clustering:

The clustering module 230 processes the working image to identify those blobs belonging to the same person or object of interest so as to accurately identify or locate that person or object within the image. Specifically, a "clustering" process is used to identify each set of blobs in the working image that potentially belong to a particular person or object of interest.

One method of accomplishing this is to compare every possible combination or cluster of blobs to the aforementioned model for determining the closest match between a particular cluster of blobs and the model. However, as the number of blobs increases, a corresponding exponential increase in the number of candidate blob combinations reduces the performance of this method. Further, with this method, some candidate blob clusters would be either too small or too large to compare favorably to the model, and such comparisons would tend to waste both time and computing power.

A more preferred method for generating candidate clusters of blobs is to connect all blobs based on a minimum spanning tree. To this end, all the blobs are connected together via the shortest total length of connections. The length of a connection between any two blobs may be determined using any consistent method for determining distance between the blobs. For example, one such method would compute the distance between the centroids of connected blobs. Another exemplary method is to connect two blobs with a line segment or link between the centroids of the blobs, then to compute the length of the portion of the line segment between the point where the line leaves the first blob and the point where it enters the second blob. Still another exemplary method is to compute the distance between the nearest pair of points on two neighboring blobs.

The minimum spanning tree method provides a starting point for ensuring that blobs which are physically close together are used to generate candidate clusters, while blobs which are further apart are not. Specifically, once all blobs have been connected, connection links that exceed a prescribed threshold distance T are eliminated, thereby producing at least one initial blob cluster. Elimination of these longest links serves to eliminate some or all links to spurious blobs, and to reduce the number of blob clusters likely to be identified as invalid based on the subsequent comparison to the model. Of the remaining n links, candidate clusters of blobs are then generated by eliminating all possible combinations of the longest m links, where m is an integer value between 0 and n. In other words, every possible combination of connected blobs, produced by every possible combination of elimination of the longest m links, serves to generate an initial group of candidate blob clusters. In one tested embodiment a value of m=5 produced candidate blob clusters that allowed for good identification and location of people or objects within the scene.

For example, where elimination of links exceeding the aforementioned threshold distance leaves at least m links, subsequent elimination of all possible combinations of the longest tit links will generate a set of $2^m$ groups of candidate blob clusters, with each group comprising a number of distinct blob clusters. As the value of m is increased, the number of possible groups of blob clusters increases exponentially. Consequently, a larger sample of candidate clusters is generated as m is increased, thereby improving system accuracy, but decreasing system speed by requiring a larger number of comparisons of candidate blob clusters to the model.

Identification and Location:

The identification and location module 240 first examines the area of each candidate cluster in each group. The area of a cluster of blobs is approximated by summing the area of each image pixel making up the blobs in that cluster. Any cluster of blobs having an area that is not within a prescribed size range is discarded. This prescribed size range is a function of the size of the model. In other words, any cluster of blobs having an area that is obviously too small or too large to correspond to the person or object of interest is discarded. However, while it is preferable to discard clusters that are either too small or too large, it is not necessary to discard such clusters.

Each of the remaining c candidate blob clusters in each group is then compared to the model to determine whether it corresponds to a person or object of interest. Comparison of a candidate blob cluster to the model is accomplished by first computing the three-dimensional (x, y, z) mean or centroid of each blob cluster. The spatial coordinates of this centroid are then subtracted from the spatial coordinates of each pixel in the blob cluster to center the spatial location of the blob cluster. The covariance matrix for that cluster's constituent centered image pixels is then computed. Next, the first two eigenvalues of the covariance matrix are used to define an ellipsoid to represent the candidate blob cluster. Specifically, the first eigenvalue provides the half-length of the major axis of the ellipsoid, while the second eigenvalue provides the half-length of the next longest axis of the ellipsoid. This method works well with roughly cylindrical objects such as people, where it is assumed that the width and depth of the ellipsoid are approximately equivalent.

In the first of the aforementioned embodiments, the model of the person or object of interest is defined by the expected values of these two eigenvalues, $\lambda_1$ and $\lambda_2$. Consequently, a comparison is made of the eigenvalues associated with each group of candidate clusters and the expected values associated with the model to determine which group of candidate clusters is closest to the model.

Specifically, for each of the c clusters of blobs, there are two associated eigenvalues of the cluster's covariance matrix, $\lambda_{1i}$ and $\lambda_{2i}$, where $i \in [1, 2 \ldots, c]$. The deviation, d, between the eigenvalues of each group of c clusters and the expected value associated with the model may be determined by equation (1):

$$d = \sum_{i=1}^{c} [(\lambda_{1i} - \lambda_1)^2 + (\lambda_{2i} - \lambda_2)^2] \quad (1)$$

This equation computes the deviation by summing the squares of the differences between the eigenvalues of a blob cluster and the eigenvalues of the model, then summing these differences for each blob cluster in a candidate group of blob clusters. The group of c clusters having the smallest deviation, d, to the model is chosen as best representing persons or objects of interest contained in the working image. The spatial location of each of the chosen blob clusters in the working image corresponds to the spatial location of the persons or objects of interest in the live depth image.

Operation:

The above-described program modules are employed to identify and locate people and objects of interest in a scene using the process that will now be described. This process is depicted in the flow diagram of FIG. 3 as a series of actions that illustrate an exemplary method for identifying and locating people or objects within a scene.

Figure 3:
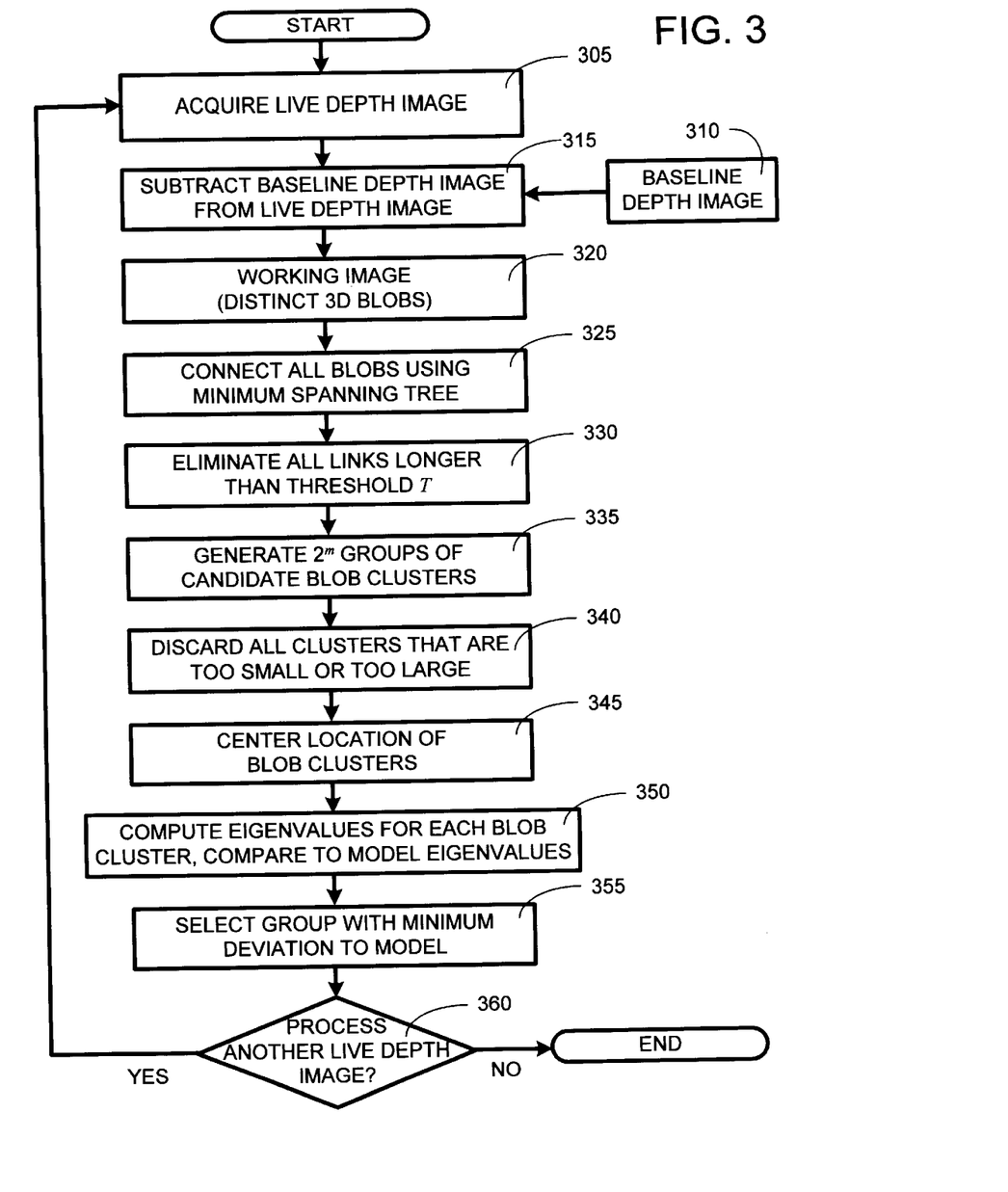
FIG. 3 is a flow diagram illustrating an exemplary process for identifying and locating persons and objects in a scene according to the present invention.

The process is started by acquiring a live depth image 305 as described above. A baseline depth image 310, also acquired as described above, is then subtracted 315 from the live depth image 305 to produce a working image 320 comprised of at least one distinct three-dimensional blob. It should be noted that new or updated baseline depth images are generated as described above when the area of interest is physically changed. For example, when furniture is added to, removed from, or moved within the area of interest, a new baseline depth image may be generated.

Next, all blobs are connected 325 with the shortest possible total length of connection links using a minimum spanning tree. All connection links longer than a prescribed threshold T are then eliminated 330 thereby producing at least one initial blob cluster. Every possible combination of the longest m connection links is then eliminated, thereby generating $2^m$ groups of candidate blob clusters 335 from the initial blob clusters produced in process action 330. Of these $2^m$ candidate blob clusters, all clusters of blobs whose size are not within a prescribed range are discarded 340.

Next, the mean or centroid is computed for each blob cluster, and the spatial coordinates of this centroid are subtracted from the spatial coordinates of each pixel in the blob cluster to center the spatial location of the blob cluster 345. The covariance matrix for the cluster's constituent centered image pixels is then generated to compute the first two eigenvalues of the covariance matrix. These eigenvalues are used to define an ellipsoid to represent the candidate blob cluster and are compared to expected values defining the model 350. The group of candidate blob clusters whose eigenvalues overall have the minimum deviation to those of the model is then selected 355 as best representing persons or objects of interest contained in the working image. The spatial location of the selected blob clusters in the working image corresponds to the spatial location of the persons or objects of interest in the live depth image.

Finally, the process actions described above (305 through 355) are repeated for each new live depth image 360. The process is ended when there are no more live depth images to process.

Figure 4:
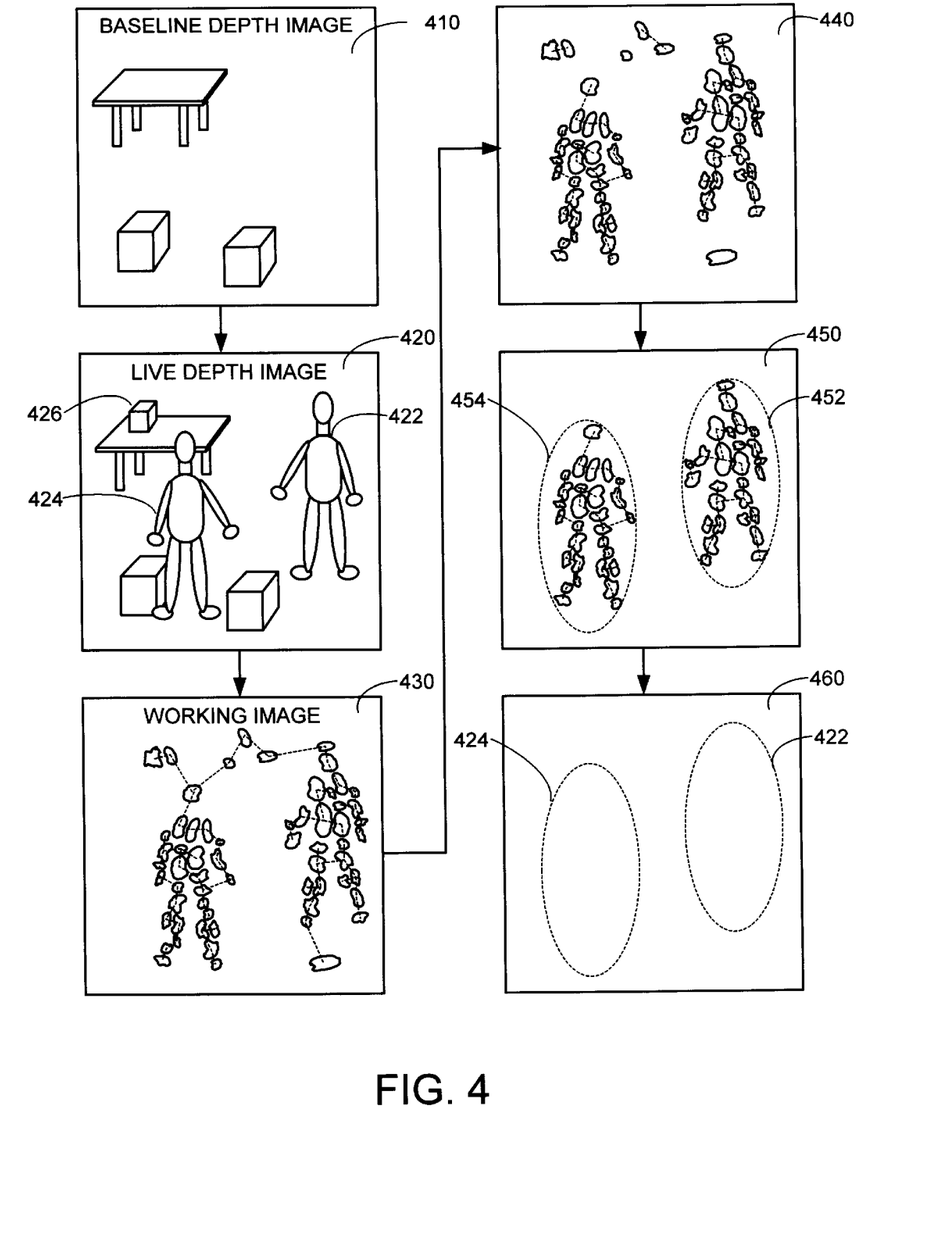
FIG. 4 is an exemplary pictorial flow diagram illustrating the operation of the exemplary process of FIG. 3.

FIG. 4 is an exemplary pictorial flow diagram illustrating the operation of the exemplary process of FIG. 3. FIG. 4 is intended for illustrative purposes only, and is not intended to limit the scope of the present invention. In this example, a person sized elliptical model is used to identify and locate people in the live image while ignoring other objects not sufficiently close in size to the model.

Specifically, Box 410 shows an exemplary baseline depth image. Box 420 shows an exemplary live depth image 420. The live depth image of Box 420 contains people 422 and 424, and object 426 not contained in the baseline depth image of Box 410. Box 430 shows an exemplary working image comprised of a plurality of distinct three-dimensional blobs produced using a background subtraction process to subtract the baseline depth image from the live depth image. Further, Box 430 shows that all of the blobs have been connected using a minimum spanning tree. Next, Box 440 illustrates that the elimination of blob connections exceeding the prescribed threshold T serves to generate a set of initial connected blobs or blob clusters.

Subsequent elimination of every possible combination of the longest m connection links then generates $2^m$ groups of candidate blob clusters from the initial blob clusters illustrated in Box 440. Box 450 illustrates one group from the set of $2^m$ groups of candidate blob clusters. Further, as illustrated in Box 450, blob clusters that are either too large or too small to compare favorably to the person sized elliptical model have been discarded, leaving blob clusters 452 and 454. It should be noted that blob clusters representing the object 426 illustrated in Box 420, as well as other blob clusters resulting from image noise or distortion have been eliminated at this time.

Next, the locations of each of the remaining blob clusters 452 and 454 are then centered by subtracting the spatial coordinates of the centroid of each blob cluster from the spatial coordinates of each pixel in that blob cluster. The eigenvalues associated with each blob cluster 452 and 454 are then obtained from the covariance matrix for each cluster's constituent centered image pixels and compared to the expected eigenvalues for the person sized elliptical model of this example. For the purposes of this example, it is assumed that the deviation between the eigenvalues of the blob clusters 452 and 454 represents the minimum deviation for the set of $2^m$ groups of candidate blob clusters. Consequently, the group of candidate blob clusters 452 and 454 are selected as best representing persons in the working image. Finally, as illustrated in Box 460, the spatial location of blob clusters 452 and 454, prior to centering, is then used to identify the spatial location of the people 422 and 424 represented by the blob clusters in relation to the live depth image.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] C. Wren, A. Azarbayejani, T. Darrell and A. Pentland. Pfinder: Real-time tracking of the human body. In *IEEE Transactions on Pattern Analysis and Machine Intelligence*, July 1997, Vol. 19, No. 7, pages 780–785.

[2] I. Haritaoglu, D. Harwood and L. Davis. W4—Real-time detection and tracking of people and their parts. *University of Maryland technical report*, August 97.

[3] M. Isard and A. Blake. Contour tracking by stochastic propagation of conditional density. *Proc. ECCV* 1996.

[4] S. Rowe and A. Blake. Statistical mosaics for tracking. J Image and Vision Computing, 14(8), 1996.

[5] C. Eveland, K. Konolige and R. C. Bolles. Background modeling for segmentation of video-rate stereo sequences. In *Proceedings of the IEEE Conference on Computer Vision and Pattern Recognition*, page 226, 1998.

[6] I. Haritaoglu, D. Harwood and L. Davis. $W^4$S: A real-time system for detecting and tracking people in 2½D. *Image and Vision Computing Journal*, January 1999.

[7] T. Darrell, G. Gordon, M. Harville and J. Woodfill. Integrated person tracking using stereo, color, and pattern detection. In *Proceedings of the IEEE Conference on Computer Vision and Pattern Recognition*, page 601–609, Santa Barbara, June 1998. IEEE.

What is claimed is:

1. A computer-implemented process for identifying a cluster of blobs representing an object being sought in a depth image comprising:

generating at least one candidate cluster of blobs;

comparing each candidate cluster to a model of the object; and designating the candidate cluster having a highest degree of similarity to the model as corresponding to the object being sought in the image.

2. The computer-implemented process of claim 1 wherein a background subtraction process generates the depth image.

3. The computer-implemented process of claim 1 wherein generating the at least one candidate cluster of blobs comprises:

identifying distinct blobs in the image; and selectively combining the blobs.

4. The computer-implemented process of claim 1 wherein generating each candidate cluster of blobs comprises:

connecting all blobs based on a minimum spanning tree;

eliminating connections longer than a prescribed threshold; and determining all combinations of connected blobs produced by eliminating every possible combination of a prescribed number of the longest connections.

5. The computer-implemented process of claim 1 wherein generating each candidate cluster of blobs comprises determining all possible combinations of connections between the blobs.

6. The computer-implemented process of claim 1 wherein generating each candidate cluster of blobs comprises eliminating blob clusters too small to represent the model.

7. The computer-implemented process of claim 1 wherein generating each candidate cluster of blobs comprises eliminating blob clusters too large to represent the model.

8. The computer-implemented process of claim 1 wherein comparing each candidate cluster to the model comprises:
centering the spatial location of the candidate clusters;
computing a covariance matrix for image pixels defining the blobs in each cluster;
deriving a first set of eigenvalues from the covariance matrix;
comparing the first set of eigenvalues to a second set of eigenvalues representing the model.

9. The computer-implemented process of claim 8 wherein designating the candidate cluster comprises identifying the candidate cluster whose eigenvalues have the smallest deviation to the model.

10. The computer-implemented process of claim 1 wherein the object is a person.

11. A system for identifying and locating objects in a scene, comprising:
a general purpose computing device; and
a computer program comprising program modules executable by the computing device, wherein the computing device is directed by the program modules of the computer program to,
(a) subtract a baseline depth image from a live depth image to produce a working image,
(b) identify distinct three-dimensional regions in the working image,
(c) generate at least one cluster of the regions,
(d) compare each cluster to a model, and
(e) designate the cluster most similar to the model as corresponding to the identity and location of the objects in the scene.

12. The system of claim 11, wherein the program module for subtracting the baseline depth image from the live depth image to produce the working image comprises identifying pixels representing areas of the scene not present in the baseline depth image.

13. The system of claim 11, wherein the program module for identifying distinct three-dimensional regions in the working image comprises identifying distinct regions of contiguous pixels in the working image.

14. The system of claim 11, wherein the program module for generating each cluster of the regions comprises:
connecting all regions using the shortest possible total length of connections;
eliminating all connections longer than a prescribed threshold; and
determining all combinations of connected regions produced by eliminating every possible combination of a prescribed number of the longest remaining connections.

15. The system of claim 11, wherein the program module for generating each cluster of the regions comprises determining all possible combinations of connections between the regions.

16. The system of claim 11, wherein the program module for comparing each cluster to a model comprises a sub-module for eliminating any cluster having a size too small to represent an object of interest in the scene.

17. The system of claim 11, wherein the program module for comparing each cluster to a model comprises a sub-module for eliminating any cluster having a size too large to represent an object of interest in the scene.

18. The system of claim 11, wherein the program module for comparing each cluster to the model comprises:
extracting eigenvalues representing each cluster from a covariance matrix generated using image pixels existing in each region; and
comparing the eigenvalues to expected values representing the model.

19. The system of claim 18, wherein the program module for designating the cluster most similar to the model comprises selecting the cluster whose eigenvalues are closest to the expected values representing the model.

20. The system of claim 11 further comprising a program module for repeating program modules (a) through (e) for as long as it is desired to identify and locate objects in the scene.

21. The system of claim 11 further comprising a program module for acquiring the baseline and live depth images.

22. The system of claim 11 further comprising a program module for discarding any clusters not within a size range that is a function of the size of the model.

23. A computer-readable memory for identifying and locating people and objects of interest in a scene, comprising:
a computer-readable storage medium; and
a computer program comprising program modules stored in the storage medium, wherein the storage medium is so configured by the computer program that it causes the computer to,
subtract a baseline depth image from a live depth image to produce a working image,
identify blobs in the working image,
generate at least one candidate cluster of the blobs,
compare each candidate cluster to a model, and
designate the candidate cluster most similar to a model as corresponding to the identity and location of the people and objects of interest in the scene.

24. The computer-readable memory of claim 23 further comprising a program module for acquiring the baseline and live depth images.

25. The computer-readable memory of claim 23 wherein the program module for subtracting the baseline depth image from the live depth image comprises a sub-module for identifying spatial locations of pixels in the live depth image that are not present in the baseline depth image.

26. The computer-readable memory of claim 23 wherein the program module for identifying blobs comprises a sub-module for identifying regions of contiguous image pixels in the working image.

27. The computer-readable memory of claim 23 wherein the program module for generating each candidate cluster of blobs comprises sub-modules for:
connecting all blobs with the shortest total length of connections;
eliminating connections exceeding a prescribed length; and
generating all possible combinations of connections between blobs by eliminating all possible combinations of a prescribed number of the longest links.

28. The computer readable memory of claim 27 further comprising a sub-module for discarding candidate clusters not within a size range that is function of the size of the model.

29. The computer-readable memory of claim 23 wherein the program module for comparing each candidate cluster comprises sub-modules for:
centering the spatial location of image pixels represented in each candidate cluster;
computing a covariance matrix for the image pixels in each candidate cluster;
extracting eigenvalues from the covariance matrix; and comparing the eigenvalues to expected values for the model.

30. The computer-readable memory of claim 29 wherein the sub-module for centering the spatial location of image pixels further comprises the actions of computing a centroid for each candidate cluster and subtracting the spatial coordinates of the centroid from the spatial coordinates of each image pixel in the candidate cluster.

31. The computer-readable memory of claim 29 wherein the program module for designating the candidate cluster comprises a sub-module for selecting the candidate cluster whose eigenvalues have the smallest deviation from eigenvalues defining the model.

32. A system for identifying and locating persons and objects of interest in a scene, comprising:
   (a) a depth image acquisition module for producing a baseline and a live depth image;
   (b) an image subtraction module for subtracting the baseline depth image from the live depth image to produce a working image;
   (c) a clustering module for identifying and clustering at least distinct blobs in the working image;
   (d) an identification and location module for comparing each cluster of blobs to a model and identifying and locating the objects in the scene by selecting the cluster of blobs most similar to the model; and
   (e) a process module for repeating modules (a) through (d) as long as it is desired to identify and locate persons and objects of interest in the scene.

33. The system of claim 32 wherein each blob in the working image is comprised of a plurality of image pixels having spatial coordinates corresponding to their position within the scene.

34. The system of claim 32 wherein the clustering module:
   connects all blobs based on a minimum spanning tree;
   eliminates blob connections that exceed a prescribed threshold length;
   determines all possible clusters of blob interconnections resulting from the elimination of a prescribed number of the longest connection links; and
   eliminates all blob clusters not within a prescribed range that is a function of the size of the model.

35. The system of claim 34 wherein the prescribed number of the longest connection links is about 5.

36. The system of claim 33 wherein the identification and location module:
   centers the location of blob clusters by subtracting the spatial location of a centroid of each blob cluster from the pixels comprising each blob cluster;
   computes a covariance matrix for each centered blob cluster;
   extracts eigenvalues for defining a first ellipsoid from each covariance matrix;
   compares the eigenvalues to expected values for a second ellipsoid representing the model; and
   selects the blob cluster having the smallest deviation between the eigenvalues associated the blob cluster and the expected values associated with the model.

* * * * *